July 9, 1968 G. SCHLAPP 3,391,607
TRACING MECHANISM FOR DUPLICATING MILLING MACHINES
Filed Sept. 19, 1966 3 Sheets-Sheet 1

Inventor:
Georg Schlapp
BY Bailey, Stephens and Huettig
ATTORNEYS

July 9, 1968  G. SCHLAPP  3,391,607
TRACING MECHANISM FOR DUPLICATING MILLING MACHINES
Filed Sept. 19, 1966  3 Sheets-Sheet 2

Inventor:
Georg Schlapp
BY Bailey, Stephens and Huettig
ATTORNEYS

3,391,607
TRACING MECHANISM FOR DUPLICATING MILLING MACHINES

Georg Schlapp, Langen, near Frankfurt am Main, Germany, assignor to Nassovia Werkzeugmaschinenfabrik G.m.b.H., Langen, Frankfurt am Main, Germany
Filed Sept. 19, 1966, Ser. No. 580,528
Claims priority, application Germany, Sept. 21, 1965, N 27,376
9 Claims. (Cl. 90—62)

This invention relates to a tracing mechanism for a duplicating milling machine and in particular to a milling machine which operates according to the principle of the advance or trailing control of the tracer and which has a tracing rod which is pivotal in order to be angularly deflected.

Such tracing rods are generally mounted with a ball and socket joint in a tracer housing so that they can have outward movement in all directions. Alternatively, such rods are suspended with Cardan joints. The center of the ball and/or the point of the bisecting swinging axis of the Cardan joint thus from a pivot about which the tracing rod can be angularly deflected in all directions. The tracing rod is thus movable longitudinally in its axial direction and in any chosen transverse or radial direction. The end of the tracing rod which is opposite to the tracing pin fixed to the rod, with trailing control of the tracing mechanism, used when connected by way of a ball and socket joint to corresponding transmitting command means connected to the socket or electrical contacts, hydraulic valves and the like for starting and stopping the advance movements of the individual workpiece sleds. The amounts of outward movement of the tracing rod following a longitudinal axial outward movement on the tracing pin are therefore immediately transferred to the command transmitting means, and with a radial or transverse outward movement of the tracing pin, this is influenced by the ratio of the outward movement of the tracing rod. Theoretically, in order to obtain the highest degree of duplicating accuracy, they are always supposed to be transferred to the command transmitting means in constant amounts. This produces the condition in that the ratio of the outward movement, which is formed by the product of the quotient of the distance of the pivot point of the tracing rod to the center of the semi-circular point of the tracing pin and the distance of the pivot point of the tracing rod to the center of the ball of the ball and socket joint and the tangent of the angle of inclination of the ball and socket joint must always retain a definite amount set by the constructive configuration of the tracing mechanism. However, in practice, this is quite often not possible because in many cases different lengths of tracing pins must be used in order, for example, to be able to trace deeper indentations in the pattern. Generally, these difficulties are overcome by selecting tracing pins of different diameters and tools which depend on the respective length of the tracing pin and the deviation of the amount of the ratio of outward movement of the tracing rod. However, this method is clumsy, time-consuming and uneconomical. Also, the exchange of tracing pins with one of another size requires a considerable amount of adjustment because of all the possible errors which tend to reduce the accuracy of the duplicating process.

The end of the tracing rod opposite the tracing pin, when operating with advance control, engages an advance control mechanism which is used to hold the tracing pin with the aid of an advance force in constant contact with the pattern. This is accomplished by the fact that the direction of the advance force and thus the forward direction is adjusted constantly and automatically depending upon the contact tangent between the tracing pin and the pattern. The tracing pin in this case, as contrasted to trailing control, is constantly advanced by a certain amount while tracing and vis-á-vis its zero position, and during the outward movement relative to its forward direction it is brought into its zero position in which no forward movements can take place. The command transmitting means for the starting or stopping of the forward movement, corresponding to the respective outward movement of the tracing pin, that is forward movement of the workpiece sleds are for these tracing controls in communication directly or indirectly by means of a suitable transfer means with the tracing rod and in one plane. The distance between this plane and the pivot point of the tracing rod in connection with the distance of the center of the pivot point of the tracing rod and the semi-circular point of the tracing pin form here the pertinent points for the calculation of the ratio of the outward movement of the tracer. This ratio of outward movement should be always constant for accurate duplicating. However, if the tracing has to be done with different lengths of tracing pins, deficiencies again result which, as contrasted to the trailing control, for example, the selection of tracing pins having different diameters cannot be avoided because the amount of the advance is always increased with each lengthening of the tracing pin which leads to the fact that gravures whose dimensions are less than the size of the advance cannot be duplicated accurately from the pattern.

This invention has the object of avoiding the above disadvantages. In this invention, another object is to produce a tracing mechanism which permits the use of tracing pins of different lengths while the ratio of the outward movement of the tracing rod can be held constant for producing workpieces identical with the pattern. Tracing pins of the same diameter can be used at all times, and on the other hand, any desired amount of deviation vis-á-vis the pattern can be produced during the making of the workpiece by way of a definite change in the ratio of the outward movement in a deviation of the desired construction ratio and while retaining the same length and diameter of the tracing pin.

In a tracing mechanism for a duplicating machine and especially for a duplicating milling machine operating according to the principle of either the advance or trailing control of the tracer and which has a tracing rod which can be angularly displaced around a pivot point, this invention provides that the ratio of the outward movement of the tracing rod can be adjusted as desired by changing the pivot point of the tracing rod. The pivot point for the rod can be formed as either a ball and socket joint or a Cardan joint. When a ball and socket joint is used, the tracing rod preferably extends through the center of the ball and slidable therein and the sockets together with the ball are movable in the axial direction of the tracing rod and can be fixed in any position directly or indirectly in the tracer housing. When, for example, two socket plates for the ball and socket joint are used, they are held in a casing which is movably guided by a guide slot in the tracer housing and which can be secured against the tracer housing by means of a pin extending through the guide slot and a clamp engaging the pin. If the tracer pivot point is composed of, for example, by a Cardan joint, then the inner Cardan ring can engage the tracer rod as a slide bearing while the outer ring is movably guided by a slot in the tracer housing and is secured to the tracer housing by a clamp arranged on a pin on the outer ring.

This construction for the pivot point of the tracer rod permits advantageously any desired changing of the pivot point of the tracer rod in axial direction of the tracing rod, and thus an adjustment to any desired ratio of the outward movement of the tracing rod. It is thus possible that changes in the ratio of the outward movement which have to be made during the fabrication of identical and accurate workpieces by the use of tracer pins of varying lengths can be compensated. With trailing control of the tracer mechanism, it is also possible to adjust different ratios of outward movement for the creation of the desired deviation while making workpieces relative to the pattern and thus one can use tracer pins of the same or different lengths and independent of the length always with the same diameter.

When using advance control, however, the re-establishment of a constant ratio of outward movement, which is always achieved by displacing the pivot point of the tracer rod, and when using tracer pins of different lengths, causes in every case that a pattern can be duplicated with a high degree of accuracy, even when cutting gravures of less dimension than the amount of the advance. However, with advance controls, it is possible to advantageously effect the forward velocities of the workpiece sled with a desired change of the ratio of the outward movement deviating from the constant ratio of outward movement. For example, during an increase in the ratio of the outward movement, it is also possible to increase the advance and to accelerate considerably the forward drives so that high forward velocities can be used which is very desirable for some types of materials that chip or splinter easily.

A special apparatus must be provided for duplicating milling machines which operate according to the principle of the trailing control for securing the tracer rod in the tracer housing against axial movement in the direction toward the pattern. For this purpose, there is provided a bracing member holding the tracer rod against the tracer housing in the direction of the pattern, which bracing member is preferably a Cardan joint whose inner ring engages the tracer rod and which has a center ring joined to an outer ring which is carried on ball bearings on the tracer housing and movable transversely or radially in all directions.

For correctly adjusting the amount of the displacement of the pivot point of the tracer rod with regard to the chosen length of the tracer pin there is used preferably a stop arm which can be placed against the point of the tracer pin and which has a ruler which is relative to a second ruler mounted on the tracer housing. A pointer representing the theoretical pivot point of the ball and socket joint or the Cardan joint for the tracer rod is then adjustable to the divisions of the two rulers for the purpose of re-establishing a constant ratio of the outward movement of the tracer rod. The movable ruler of the stop arm is slidable in a longitudinal guide groove in the fixed ruler on the tracer housing and can be clamped tight against the fixed ruler at any height by means of a clamp screw. The reading of the scale markings to re-establish the constant ratio of outward movement is simplified by providing the movable ruler and fixed ruler with identical scales which extend in opposite directions.

A further scale for a trailing control mechanism can be arranged on the ball and socket joint or Cardan joint and which is readable with another ruler fixed to the tracer housing and which is used for the adjustment of the ratio of outward movement of the tracer rod which deviates from the constant ratio of outward movement. This constitutes a vernier which makes possible a direct reading of the ratio of outward movement which is determinative for the degree of the respective inaccuracy of duplication.

The means by which the objects of the invention are obtained are described more fully with reference to the accompanying drawings in which.

Like elements in the drawings have the same reference characters.

Figures 1, 2:
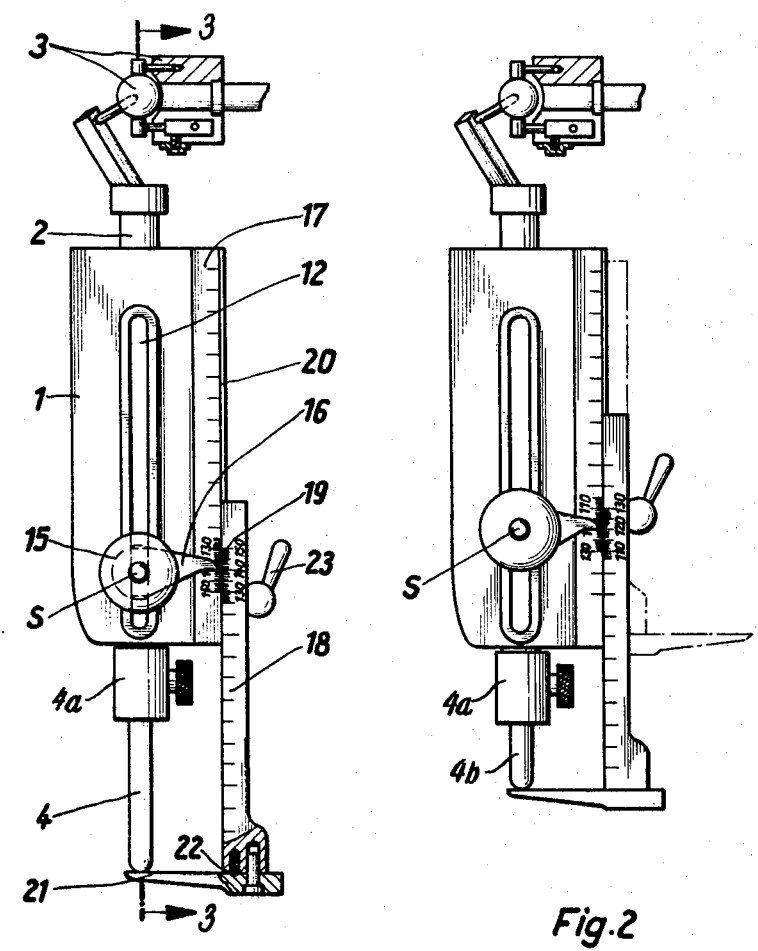
FIGURE 1 is a front view of a tracing mechanism operating according to the principle of advance control.
FIGURE 2 is a view similar to FIGURE 1 but having a tracer pin of a different length.
Figures 3, 6:
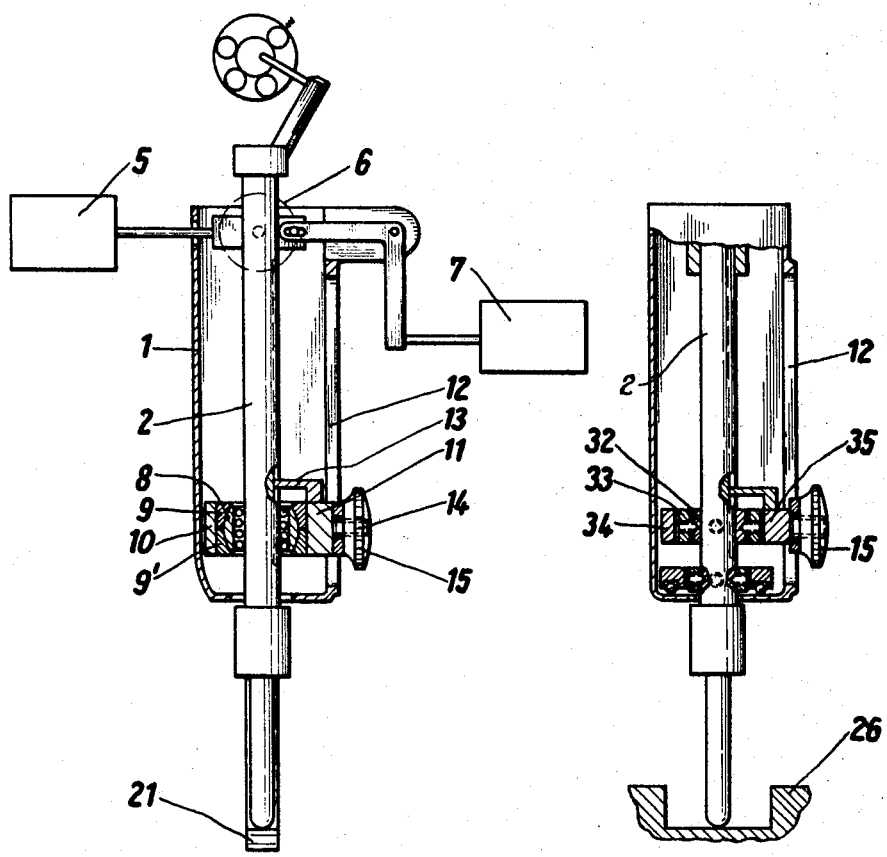
FIGURE 3 is a cross-sectional view taken on the line 3—3 of FIGURE 1.
FIGURE 6 is a view taken on the line 6—6 of FIGURE 5 showing a modification using a Cardan joint pivot point.

As shown in FIGURES 1 to 3, the tracing mechanism operates according to the advance control principle and which is composed of a tracer housing 1 in which a tracer rod 2 is mounted for angular deflection around the pivot point S. An advance control mechanism 3 is mounted on the upper end of rod 2 and a tracer pin 4 is inserted in the opposite lower end of the rod 2. As shown in FIGURE 3, command transmitters 5, 6 and 7 communicate with the tracer rod for the purpose of starting, stopping or interrupting the forward movements of the workpiece sleds. Tracer pin 4 is removably held in a chuck 4a attached to rod 2 so it may be replaced by, for example, a shorter pin 4b, shown in FIGURE 2. The advance control mechanism is conventional and not the object of this invention. It is therefore sufficient to state that the advance control mechanism produces an advance force for holding the tracer pin automatically in constant contact with the pattern and imparts to it an advance with regard to the axis of the machine tool which, through at least one of the three transmitters 5, 6 and 7, effects a forward movement of the workpiece sled whereby the forward velocity is reduced during a relative outward movement of tracer pin 4 in the direction toward its zero position, and whereby no forward movement takes place when in zero position. Hydraulic control valves, electric contacts, inductive transmitters or the like can function as the command transmitters.

Tracer rod 2 is supported in a ball and socket joint at point S so that it can be moved in all directions. This joint is composed of a flattened ball 8 provided with a central bore and a divided socket composed of two half socket plates 9 and 9′ which are held in a case 10 and secured against transverse displacement by a threaded pin, not shown in detail. The case is cylindrical and on one side has a guide rib 11 slidable in a longitudinal slot 12 in tracer housing 1. The ball and socket joint is thus movable in the direction of the axis of the tracer rod. The ball and socket joint during this movement is prevented from rotation by means of a finger 13 secured to case 10 and slidable in a longitudinally extending groove in rod 2. A threaded pin 14 on case 10 extends through the slot 12 and carries a tightening knob 15 so that the ball and socket joint can be clamped tight with regard to housing 1. A pointer 16 is carried on pin 14 between the knob and the case 10 and which is also guided in the slot 12 against rotation. Pointer 16 points to a ruler 17 having scale markings 17a and which is fixed to housing 1. A movable ruler 18 having scale markings 17a is slidable on ruler 17 by means of a shallow dovetail joint 20. The scale markings are similar but directed oppositely. A stop arm 21 is swingable on the lower end of ruler 18 so that it can be moved into and out of engagement with the tracer pin 4 and held by a detent 22. Clamp 23 extends through the longitudinal slot of ruler 18 into a threaded bore in housing 1 and is used to fix ruler 18 with regard to ruler 17 in any desired position.

Figure 4:
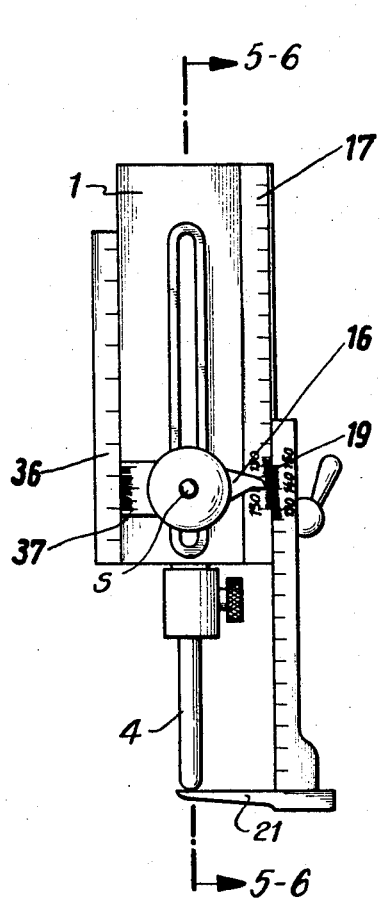
FIGURE 4 is a front view of a tracing mechanism operating according to the principle of trailing control.
Figure 5:
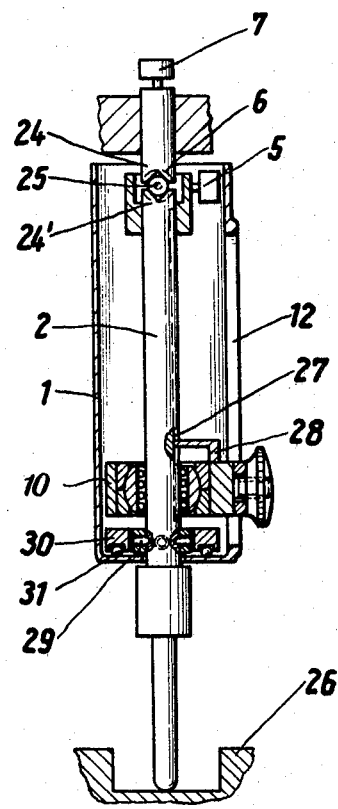
FIGURE 5 is a cross-sectional view taken on the line 5—5 of FIGURE 4 with a ball and socket pivot joint.

The tracing mechanism shown in FIGURES 4, 5 and 6 operates according to the principle of trailing control. The end of tracer rod 2 opposite the tracer pin 4 has a ball and socket joint composed of ball sockets 24 and 24′ and ball 25 which actuate the command transmitters 5, 6 and 7, which are shown schematically in FIGURE 5 for purposes of simplicity, and which act for the starting, stopping or interruption of the forward movements. FIGURE 5 shows the tracing mechanism operating on a pattern 26. Tracer housing 1 again holds the tracer rod 2, the rod being angularly displaceable around a ball and socket joint. This joint at point S is the same as shown in FIGURES 1 to 3. A guide finger 28 secured to the case 10 engages a longitudinal groove in the tracer arm and holds the tracer rod against rotation. A Cardan joint is used to permit the tracer rod to move transversely or in an axial direction with respect to the pattern. This joint is composed of an inner ring element composed of the rod 2, a center ring 29 in communication therewith, and an outer ring 30 communicating with the center ring. The bottom of the outer ring 30 has an annular groove in which are ball bearings 31 which are carried on the bottom of housing 1.

FIGURE 6 shows a modification in which a Cardan joint is used for the pivot point instead of a ball and socket joint. This Cardan joint is composed of an inner ring 32 in which the tracer rod 2 is slidably mounted, a center ring 33 attached to the inner ring and an outer ring 34 attached to the center ring. Outer ring 34 has a rib 35 which is slidable in the longitudinal slot 12 in tracer housing 1 in the same manner as the case 10 of FIGURE 3 is guided in the housing. The tightening knob 15 mounted on a threaded pin is used to clamp the Cardan joint on the tracer housing. The modifications of FIGURES 5 and 6 as in FIGURES 1 to 3 are provided with a pointer 16 and two rulers 17 and 18 which are movable with respect to each other and with the ruler 18 provided with a stop arm 21, note FIGURE 4, for the adjustment of a ratio of outward movement of the tracing rod that is always constant when using tracer pins of different lengths. An additional scale 36 mounted on the tracer housing 1 is readable by a vernier 37 joined to the pivot point S of the tracer rod. This vernier scale is vertically movable and used for the adjustment of a ratio of outward movement which deviates from the constant ratio of the outward movement. The vernier scale markings are such that the corresponding adjusted ratio of outward movement can be read directly.

The operation of the tracing mechanism is as follows. It is assumed that the scale markings of the rulers 17 and 18 are set so that, with a constant ratio of outward movement as prescribed by the construction of the tracer control mechanism, for example, a ratio of 1 to 1, identical markings of the two scales lie opposite one another and that both markings coincide with the pointer 16. This assumption is assumed in the scale setting shown in FIGURE 1. The pointer 16 is aligned with the corresponding markings "140" of the two scales. If it is desired to use a shorter tracer pin 4b as in FIGURE 2, then the clamp 23 is released and ruler 18 moved to bring the stop arm 21 into engagement with the point of the tracer pin 4b. The corresponding markings are then searched for on the scales and the pivot point S of the tracer rod is moved upwardly by releasing knob 15. The pointer 16 is then adjusted to the two corresponding markings "120" on the scales. Knob 15 is then tightened so that the pivot point of the tracer rod is in a new position in which the constant ratio of the outward movement, which had been lost by using the shorter tracer pin, has again been established. Stop arm 21 is then moving it out of the way by swinging it 180° upwardly in the position shown by the dashed lines in FIGURE 2. For a tracing mechanism operating on the principle of trailing control, it is possible to use the scale 36 and the vernier 37 to adjust to any desired ratio of outward movement if a workpiece is to be duplicated in a larger or less replication of the pattern while retaining the same tracer pin diameter and the same or different length of tracer pin. If, for example, a longer tracer pin is used, then first of all the lost constant of the ratio of outward movement, as previously explained, must be regained with the aid of the rulers 17 and 18 by displacing the pivot point S of the tracer rod in order to adjust subsequently a ratio of outward movement deviating from this constant by a renewed movement of the pivot point S of the tracer rod to the value indicated on scale 36 and corresponding to the desired increase or decrease of size on the workpiece.

Having now described the means by which the objects of the invention are obtained, I claim:

1. A tracing mechanism for a duplicating milling machine operatable with advance or trailing control of the tracer, comprising a tracer rod, a tracer rod housing, pivot means mounting said tracer rod in said housing for angular displacement by which control elements actuate a machine tool in the same direction as the outward movement of the tracer rod, and adjustable means joined to said pivot means for changing the position of said pivot means and the ratio of the outward movement of the tracer rod.

2. A tracing mechanism as in claim 1, said pivot means comprising a ball and socket joint, said tracer rod being slidably mounted through the center of the ball, and said adjustable means comprising means for clamping to said housing the socket holding the ball in any position along the axial length of the tracer rod.

3. A tracing mechanism as in claim 2, further comprising a case carrying said socket, a guide slot in said housing, and said means for clamping comprising a knob threaded to a stud attached to said case and extending through said guide slot.

4. A tracing mechanism as in claim 1, said pivot means comprising a Cardan joint having an inner ring slidably mounted on said tracer rod and an outer ring joined to said adjustable means.

5. A tracing mechanism as in claim 4, further comprising a second Cardan joint having an inner ring engaging the tracer rod, an outer ring joined to said inner ring, and ball bearing means supporting said outer ring on said housing for movement transversely of the longitudinal axis of said tracer rod.

6. A tracing mechanism as in claim 1, further comprising a tracer pin connected to said tracer rod, a stop arm engageable with said pin, and scale means attached to said stop arm for marking the position for said adjusting means for the theoretical position of said pivot means for a constant ratio of outward movement of said tracer rod.

7. A tracing mechanism as in claim 6, said scale means comprising a first ruler slidably mounted on said housing and secured to said stop arm, clamping means for holding said first ruler on said housing, and a corresponding second ruler fixed to said housing.

8. A tracing mechanism as in claim 7, said first and second rulers having identical scale markings extending in opposite directions.

9. A tracing mechanism as in claim 8, further comprising vernier means attached to said adjusting means and said housing for the adjustment of the pivot means for a ratio of the outward movement of the tracer rod which deviates from the constant ratio of outward movement of said rod.

References Cited

UNITED STATES PATENTS

| | | | |
|---|---|---|---|
| 2,076,865 | 4/1937 | Romaine | 90—62 |
| 2,557,876 | 6/1951 | Klema | 90—62 |

GERALD A. DOST, *Primary Examiner.*